United States Patent [19]
Ramzy

[11] Patent Number: 6,073,121
[45] Date of Patent: Jun. 6, 2000

[54] CHECK FRAUD PREVENTION SYSTEM

[76] Inventor: Emil Y. Ramzy, 605 N. Louise St., #204, Glendale, Calif. 91206

[21] Appl. No.: 08/939,872

[22] Filed: Sep. 29, 1997

[51] Int. Cl.[7] .................................................. G06F 17/60
[52] U.S. Cl. .................................. 705/45; 380/3; 380/4; 380/23; 380/21; 235/380; 235/379
[58] Field of Search ................................. 705/45; 380/3, 380/4, 51; 235/380, 379

[56] References Cited

U.S. PATENT DOCUMENTS

| | | | |
|---|---|---|---|
| 4,357,529 | 11/1982 | Atalla | 235/380 |
| 5,239,583 | 8/1993 | Parrillo | 380/23 |
| 5,594,225 | 1/1997 | Botvin | 235/379 |
| 5,890,141 | 3/1999 | Carney et al. | 705/45 |

Primary Examiner—James P. Trammell
Assistant Examiner—Mussie Tesfarmaariam
Attorney, Agent, or Firm—Monty Koslover Assoc.

[57] ABSTRACT

A method which improves check fraud prevention systems both in printing and verifying checks at their entry points. The method operates by printing on each issued check, a line of encrypted machine-only readable symbols such as a bar-code that contains all the information printed on the check, using a special, key-selectable encryption algorithm. When a check is presented to a bank teller or a cashier, a required, modified reader/decoder device connected to a computer, will read the line of encrypted data and identify a fraudulent check for rejection. The method requires primarily computer software additions and changes. Expensive replacement of existing equipment is avoided.

4 Claims, 5 Drawing Sheets

Fig. 1.
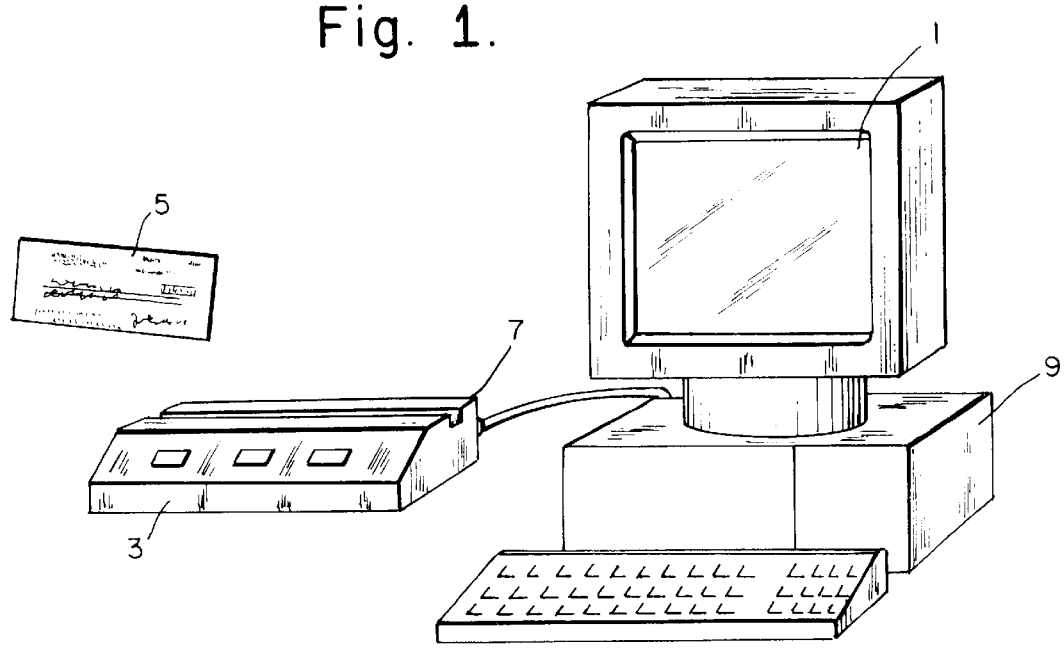
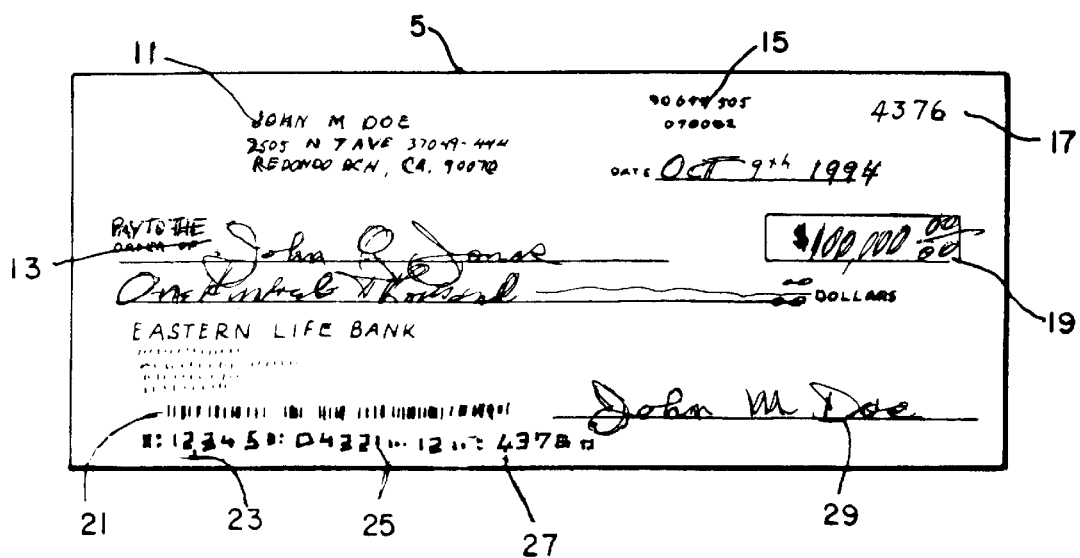
Fig. 2.

CHECK FRAUD PREVENTION SYSTEM

BACKGROUND OF THE INVENTION

1. Field of the Invention

The invention relates to bank systems for printing and processing checks and to merchant check verification systems, and more particularly to a check fraud prevention method which is for incorporation in existing systems for printing, processing and verifying checks.

2. Background

Check fraud is accelerating at an ever increasing rate. The annual losses in the U.S. is estimated to be about $10 billion, with banks and large corporations taking the brunt of the losses. More than 1.2 million worthless checks enter the banking system every day and the number of cases involving fraudulent checks of $100,000 and higher has increased 100% from 1990 to 1994.

Advanced check production systems printing the MICR (Magnetic Character Recognition) codes have been developed, and many special check papers used by banks are widely available. This makes the counterfeiters job easier for the production of counterfeit checks. There are, at present, no known and readily available methods to the banks for effectively blocking the counterfeiters and preventing continuing check fraud.

A typical check scam is for a counterfeiter to obtain temporarily, a bank check or company pay check from an individual, and then to counterfeit the check, copying everything but the name and check amount. Names and amounts may then be added to many such checks, and the checks cashed. This and similar check counterfeits, are difficult for present bank check verification systems to detect.

Other known bank check verification systems which may not be yet incorporated, appear to offer little promise of rectifying attempted check fraud such as that described above. Some are these are as follows:

U.S. Pat. No. 3,829,133 Smagala-Romanoff describes a type of check which incorporates a masked individual code known only to the authorized drawer of the check who has advance knowledge of the key by which the individual code is determined.

U.S. Pat. No. 5,509,592, Oz describes a monetary instrument such as a check, that bears a machine-only readable indication of selected information thereon. The described system and method provides for point of presentation verification of either a signature or other selected check information.

U.S. Pat. No, 4,231,593, Bell Jr. et al, describes a check having first and second coatings, one of which is electrically conductive and the other electrically non-conductive. The objective is to defeat any attempts at check alteration.

U.S. Pat. No. 5,371,798, McWhortor discloses a method of producing a check by dividing the clear band of the check into two parallel portions: one portion printed with ferrous beaded ink and the other portion printed with non-ferrous inks. The aim is to distinguish the genuine check from improperly printed checks.

U.S. Pat. No. 5,594,225, Steger describes a system for retailers to automatically access and verify, a presented personal check account status based on information encoded in a bar code on the face of the check. The system will also verify the account status of Travelers checks or Money Orders.

A careful detailed review of the above patent disclosures results in the conclusion that although each method may be useful in combatting check fraud, particularly those involving personal checks, they would not be effective, separately or combined, in preventing bank check or company pay check fraud scams such as described earlier.

There is, therefore, a need for a check fraud prevention system that is capable of preventing fraud on bank checks and industry wide checks as well as on personal checks. Such a system must be easily integrated into existing bank and retailer equipment to be universally effective.

SUMMARY OF THE INVENTION

The present invention is a method that provides entry point verification to determine if fraudulent checks are presented. It utilizes special computer software programs that are incorporated into current banking computer software for printing checks and processing checks, and at merchant retailers. Additional reader scanning heads are required for standard check reader/decoder devices used at each entry point.

The system operates by printing on each issued check, a line of machine-only readable symbols such as a bar-code that contains all the information printed on the check, using a special, key-selectable encryption algorithm. When a check is presented to a bank teller or a cashier, a reader/decoder device connected to a computer, will read the line of encrypted data and identify a fraudulent check for rejection.

Accordingly, it is a prime object of the present invention to provide a system that is capable of detecting counterfeited or altered checks and immediately rejecting them.

Another object is to provide a check fraud prevention system that can be easily incorporated in current bank check printing and check processing systems.

Yet another object is to provide a check fraud prevention system that requires no expensive replacement equipment for bank, industry or merchant existing equipments.

Further objects and advantages of the present invention will be apparent from study of the specification description, the claims and the attached drawings.

BRIEF DESCRIPTION OF THE DRAWINGS

FIG. 1 is a perspective view of the equipment used for the verification of checks according to the present invention, particularly showing a check about to be placed in a check reader/decoder for scanning check data;

FIG. 2 is a front face view of a check, particularly showing a typical bar-code which is one form of machine-only readable symbols, containing encrypted check data which is printed on checks in accordance with the present invention;

DESCRIPTION OF THE PREFERRED EMBODIMENT

Figure 3:
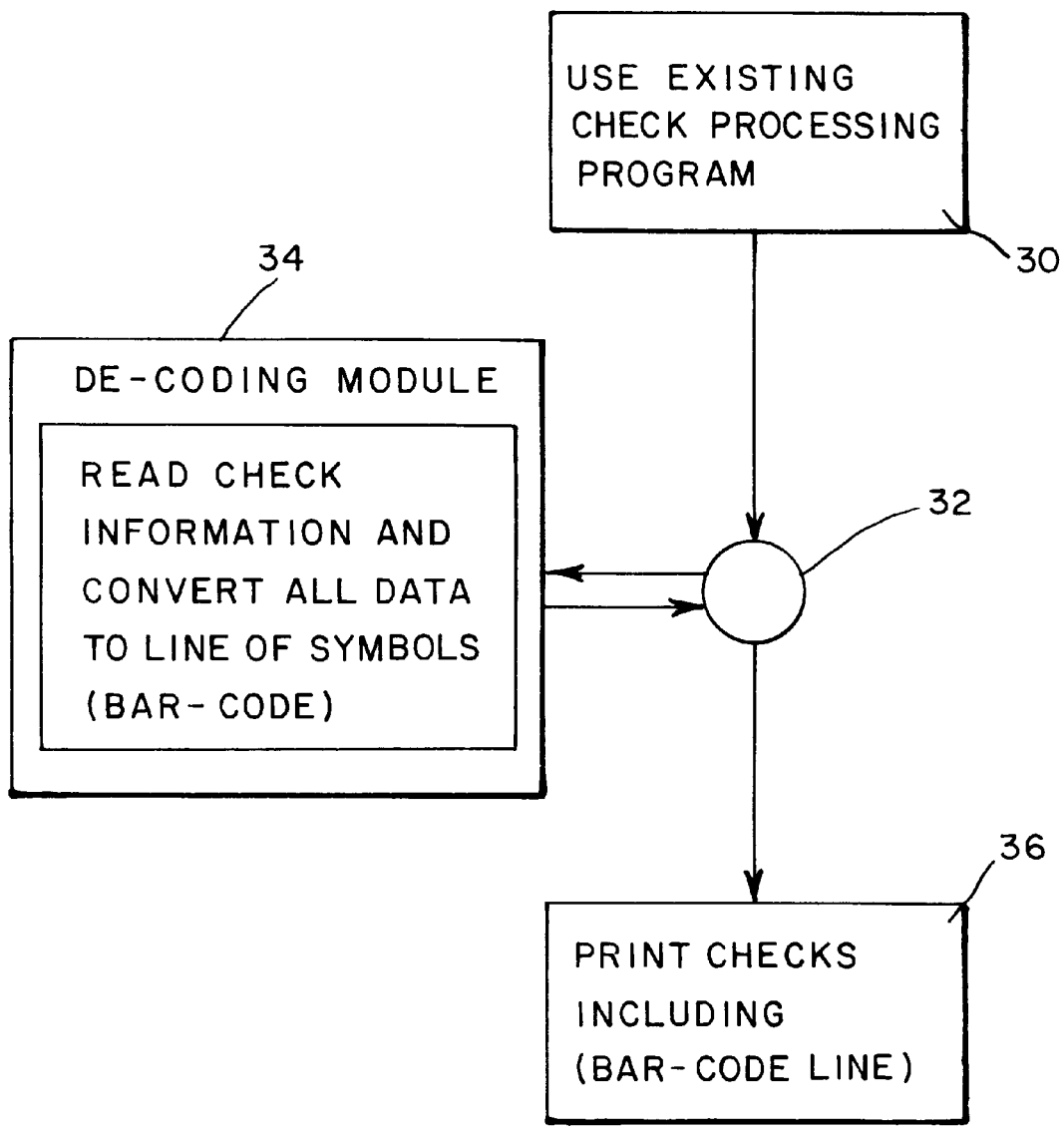
FIG. 3 is a block diagram flow chart of an improvement to a bank check printing system, incorporating a procedure for reading and converting all check face data to a line of encrypted machine-only readable symbols, according to the present invention.

Referring particularly to the drawings, there is shown in FIG. 1 a perspective view of typical bank or merchant equipment for verifying checks, that would employ the present invention method.

The equipment is a monitor 1, a PC unit 9 and a check reader/decoder 3 which is connected input to the PC 9. To use the equipment, a check 5 is passed through a slot 7 in the reader/decoder 3, which, using one or more additional reading heads, scans all the data on the check, decodes any encrypted symbols and then passes the information to the PC 9 for processing. The PC 9 then displays information on the monitor for the teller or cashier to act on or to review. For example, a keyboard entry input may be requested or a simple "Check OK" or "Reject check" may be displayed.

FIG. 2 is a view of the face of a check 5 that is printed using the present invention method and which may be presented for entry point verification. On the face of the check are the following data items: the name and address of the account owner 11; the name of the payee 13; the issuing bank number 15; a check number 17; the check date; the check amount 19; a line of bar-code symbols 21 containing check data; the name of the issuing bank; an MICR line showing the check number 23, the transit number 25 and the record number 27; and the signature of the payer 29.

In the case of bank checks or industry printed checks, such as pay checks or checks made for goods or services, all the printed check face data listed above would be encrypted, using a special, key-selectable algorithm. A representative machine readable only bar-code line 21 or any other selected machine readable only symbols containing the encrypted data, would be printed on the check face above the MICR line.

For personal checks, the check date, payee name, check amount and payer signature would not be included in the printed bar-code above the MICR line. However, with the permission of the check account owner, the account PIN number would be included to aid in verification of the check signatory identity.

A special system software program to perform the fraud prevention method described herein, is required for incorporation in the existing bank check printing and check verification software, and is part of this invention. It is intended to file a U.S. patent application for the special software program as soon as possible.

FIG. 3 illustrates the major steps in a check printing program, modified in accordance with the present invention method, Initially, the steps of the existing check processing program 30 are performed. The input check information to be printed on the check face is then sent to the printer for printing in the desired format. During this time, the input check information stream 32 is also passed to a decoding module 34 which uses a special key-selectable algorithm to convert all the data to a line of machine-only readable symbols, such as a bar-code. This line of symbols or bar-code is then printed 36 on the check face just above the MICR (Magnetic Ink Character Recognition) line located at the bottom of the check face.

Figure 4:
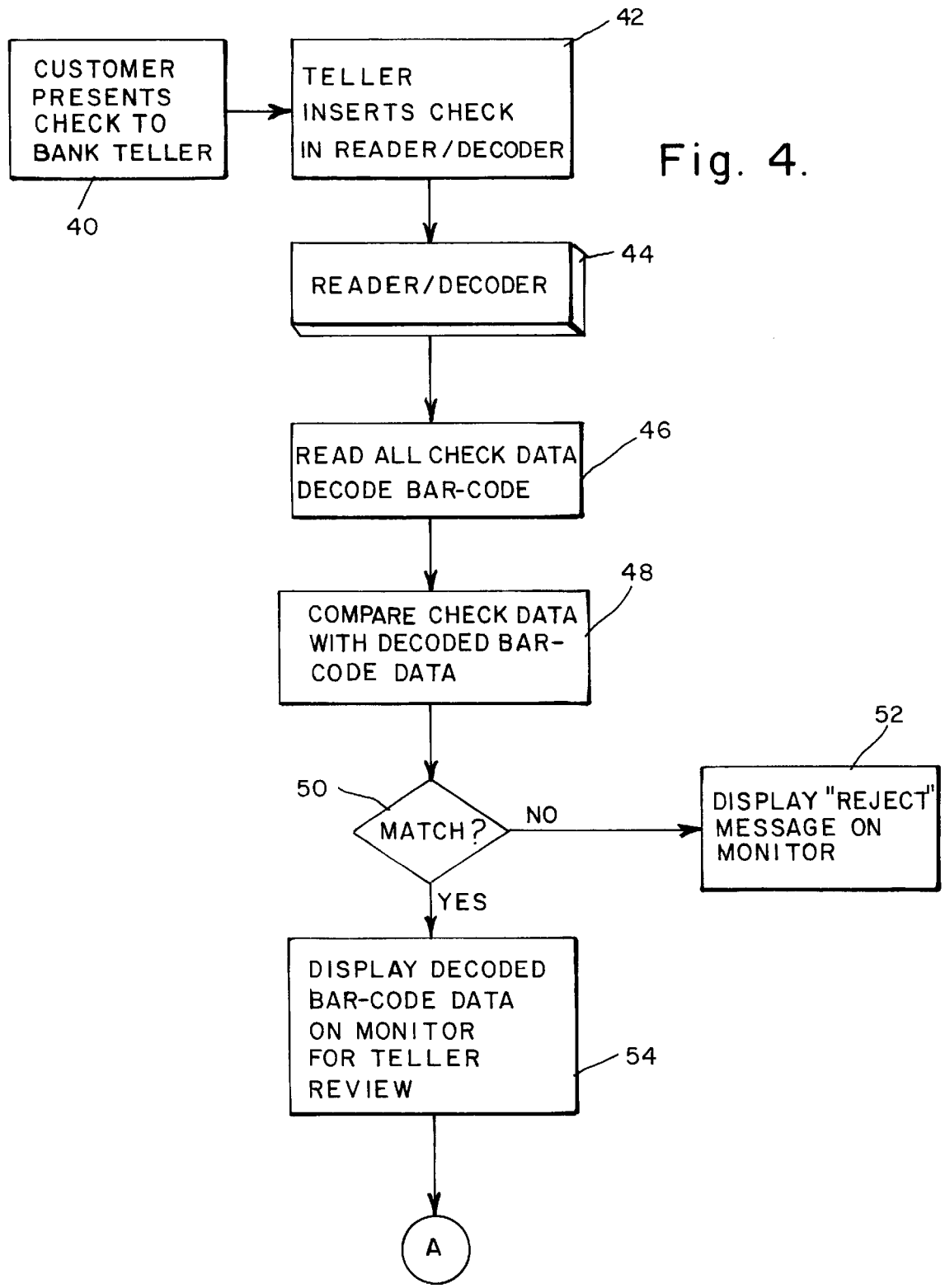
FIG. 4 and FIG. 5 are respectively, the first and second parts of a block diagram flow chart, illustrating a system procedure for bank teller verification of a customer presented check according to the present invention.
Figure 5:
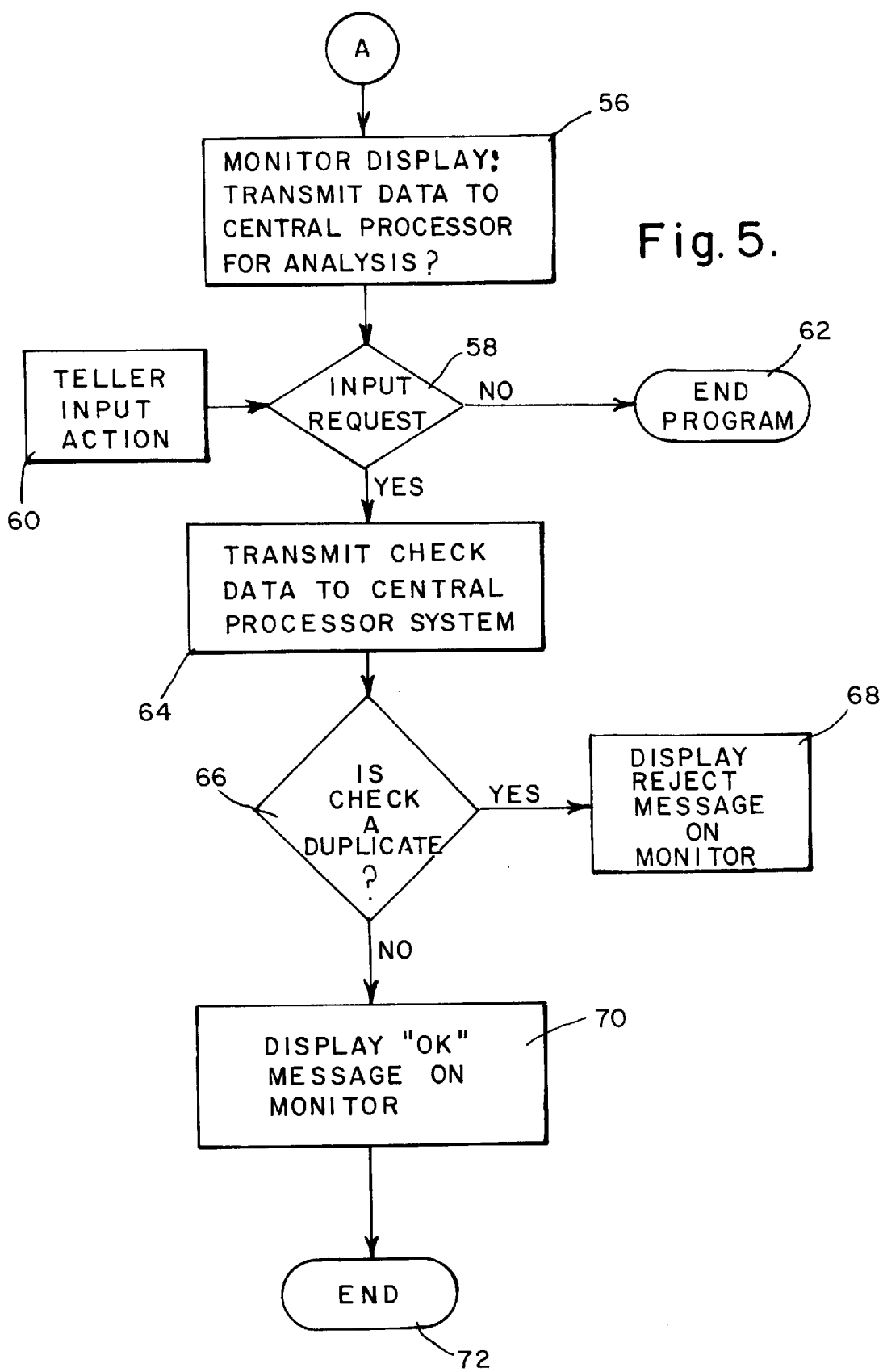

Refer now to FIGS. 4 and 5 which are respectively, the first and second parts of a simplified flow chart, illustrating the steps taken by the system when a check is presented to a bank teller for verification and processing, according to the present invention. The system process steps are as follows:

1. The customer first presents a check to a bank teller 40.
2. The teller inserts the presented check 42 in a reader/decoder 44 for scanning.
3. The reader/decoder 44 reads all printed check data and decodes 46 the symbol line (bar-code) that is above the MICR line.
4. The computer compares the printed check data with the decoded symbol or bar-code line 48.
5. The computer decides if the printed and decoded data match 50.
6. If no match is found, the computer displays a "Reject" message on the monitor 52.
7. If a match is found, the monitor displays the decoded symbol or bar-code line data on the monitor for the teller review 54.
8. After a short period of time for teller review of the displayed data, the monitor displays a request for teller input: "(Do you want to) transmit the data to the central processor for analysis?. Input Yes or No." This action is at the discretion of the teller who may suspect that the check is a duplicate, or has some other hidden and undetected error.
9. The teller keyboard inputs a reply 60 to the computer 58.
10. If the teller input reply 60 is "No", the program is ended 62.
11. If the teller input reply is "Yes", the check data is transmitted to a central processing system for analysis.
12. The computer then queries the central processing system 66: "Is the check a duplicate? Or is there any other reason to reject it?".
13. If the answer is "Yes", the monitor displays a "Reject" message 68.
14. If the answer is "No", the monitor displays an "OK" message 70, and ends the program 72.

It should be understood that there are actually many more steps in the software computer program that will carry out the computer functions for the check verification process.

Those computer steps listed above in the discussion of the flow chart are only the essential required steps, and are discussed to particularly point out how the system operates.

Figure 6:
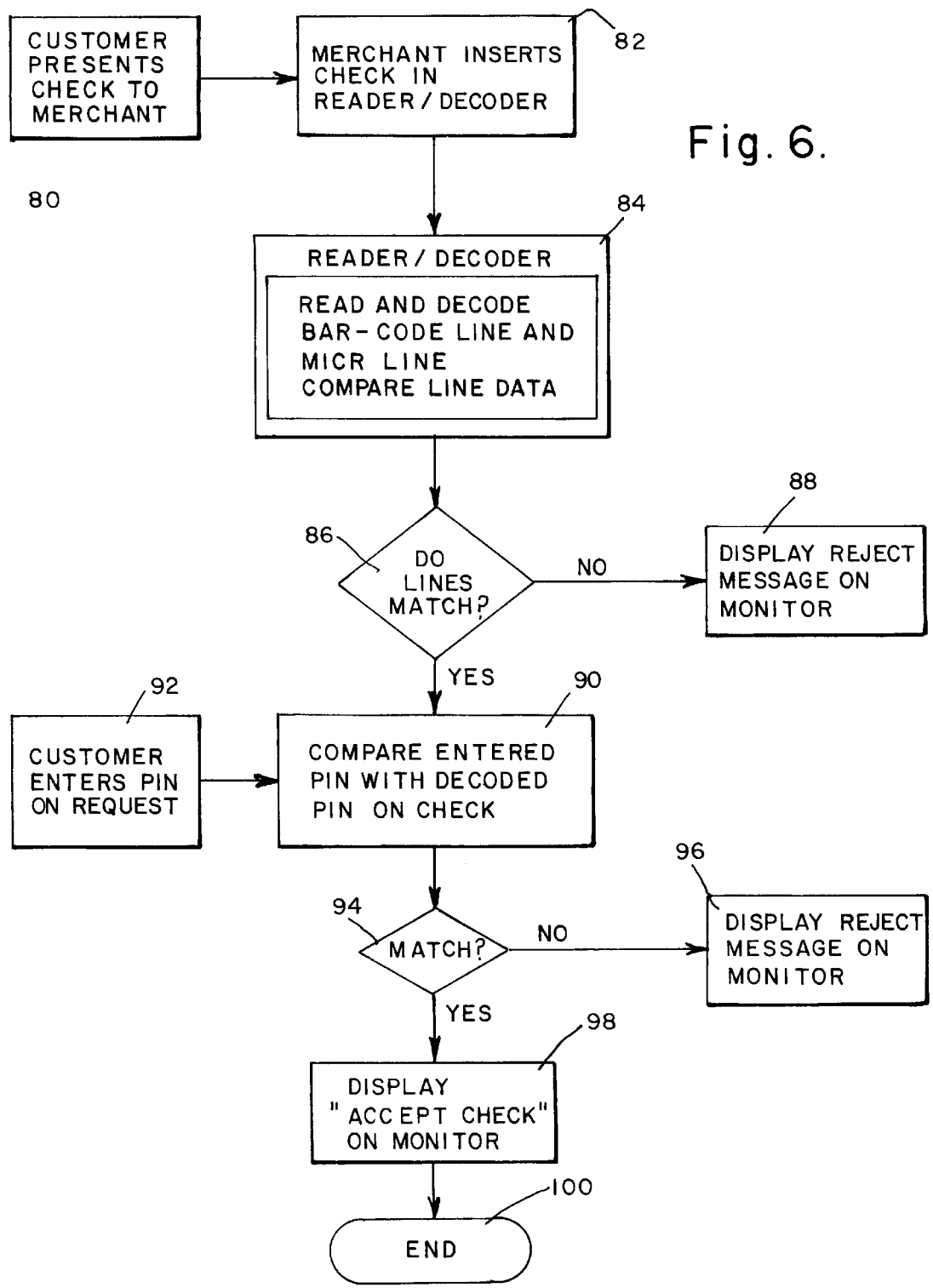
FIG. 6 is a block diagram flow chart, illustrating a system procedure for merchant verification of a customer presented check, according to the present invention.

Referring now to FIG. 6, there is shown a simplified flow chart of the system for check verification and fraud prevention that would be used by a merchant or retailer entry point, The system process steps are as follows:

1. A customer presents a check to a merchant 80.
2. The merchant inserts the check in a reader/decoder for scanning 82.
3. The reader/decoder reads and decodes the check line of symbols or bar-code located above the MICR line, and also reads the MICR line, comparing the bar-code (symbol) line with the MICR line data 84, to determine if they match 86.
4. If the line data does not match, a "Reject" message 88 is displayed on the monitor.
5. If the line data does match, a request to enter the customer PIN number is displayed on the monitor to verify the customer identity.
6. The customer enters his PIN number 92 and the entered PIN number is compared 90 with the decoded PIN number on the check.
7. If a PIN match is not found, a "Reject" message 96 is displayed on the monitor.
8. If a PIN match is found, an "Accept Check" message 98 is displayed on the monitor and the program ends 100.

The foregoing method steps may be incorporated in the method illustrated and described in FIGS. 4 and 5 for use in bank check verification and processing. This is largely a matter of software convenience, and will be used wherever applicable.

It should be noted that the above retailer/merchant system can not verify the amount written on the check or the check signature and date. These data are written on the check by the customer, usually in the presence of the merchant's cashier, and are therefore not included in the encrypted line of symbols or bar-code that will have been printed on the check.

The use of a PIN number encoded on personal checks will go a long way to establishing the identity of the check writer, since a thief is not likely to know the PIN number of a checking account for stolen checks.

Additional method steps which add to the effectiveness of the check fraud prevention method described above are the following optional steps:

In encrypting the line of machine-only readable symbols that contain the check data on each check, the encryption code key can be made selective by the operator, who can periodically change the key. This would apply only to bank and business printed checks and not to personal checks, where this would not be practical.

Regarding banks and businesses which have taken most of the serious check fraud losses: if the above described system of check printing by banks and industry is used, further security measures can be added to prevent fraud. The above described security measure of periodically changing the encryption code key for the line of symbols on a check, is an example.

All banks and companies using the system would have to be confidentially notified of the key code changes in order to incorporate them in a timely fashion. There are other similar security measures that may be added to the established fraud prevention system without the introduction of additional software or equipment.

In the discussion of the equipment used for the system invention, the use of reader/decoder devices was described. These equipments are mot new and are currently used at many establishments including banks at check entry points. Modified and/or additional reader/decoder scanner heads will be required. These heads will be programed for reading and decoding the line of symbols encrypted and added during check printing. The added equipment cost required by all system users will therefore be comparatively small.

From the foregoing description, it is clear that the objects of the present invention have been met.

Alternative embodiments and modifications may be apparent to those skilled in the art. These alternatives and modifications are considered to be within the spirit and scope of the present invention.

Having described the invention, what is claimed is:

1. An improvement to current check fraud prevention methods for printing a check, wherein the improvement comprises the added steps of:

(a) reading all the check data to be printed on a check face;

(b) converting said check data to a line of machine-only readable symbols, using a specially encoded, key-selectable encryption algorithm;

(c) printing said line of machine-only readable symbols containing check data, above the MICR line of symbols on the lower face of said check;

whereby, the addition of said line of machine-only readable symbols permits the detection of any unauthorized changes made to the printed data on said check.

2. A method of verifying checks to prevent check fraud, for verification systems having a reader/decoder device connected to a computer, for use with checks that have, printed on their face, a specially encoded, key-selectable encrypted line of machine-only readable symbols that contains all check face data, the method comprising the steps of:

(a) inserting a presented check in said reader/decoder for scanning;

(b) reading all printed check data on the face of said check and decoding said specially encoded, key-selectable encrypted line of machine-only readable symbols, producing a decoded line of check data;

(c) comparing said printed check data with said decoded line of check data to determine if they match;

(d) displaying on a monitor, a "Reject" message if no match is found;

(e) displaying on a monitor, if a match is found, said decoded line of check data for teller or cashier review;

(f) displaying on a monitor after a short time for review, a request for teller input: "Transmit the data to central processor for analysis? Yes or No";

(g) ending program If teller input reply is "No", else, (h) transmitting said decoded line of check data to said central processor and requesting analysis for errors or other reasons for rejection including check duplication;

(i) displaying on said monitor a "Reject" message or an "OK (Accept)" message depending on the response received from said central processor after check analysis;

(j) ending program.

3. The improvement according to claim 1, wherein said improvement further includes in step (b):

changing periodically, the key to the encryption code used to produce said line of machine-only readable symbols containing check data, in response to input from a system operator.

4. The method of verifying checks according to claim 2, further including in step (a):

inputting to said computer, a changed key to the encryption code used to produce said line of machine-only readable symbols containing check data when such change is required.

* * * * *